US008665346B2

(12) United States Patent
Okazaki

(10) Patent No.: US 8,665,346 B2
(45) Date of Patent: Mar. 4, 2014

(54) IMAGE PICKUP APPARATUS WITH NOISE ELIMINATION

(75) Inventor: Mitsuhiro Okazaki, Saitama (JP)

(73) Assignee: Nikon Corporation, Tokyo (JP)

(*) Notice: Subject to any disclaimer, the term of this patent is extended or adjusted under 35 U.S.C. 154(b) by 145 days.

(21) Appl. No.: 12/823,456

(22) Filed: Jun. 25, 2010

(65) Prior Publication Data

US 2011/0096206 A1 Apr. 28, 2011

(30) Foreign Application Priority Data

Jun. 26, 2009 (JP) ................................ 2009-152051

(51) Int. Cl.
*H04B 15/00* (2006.01)
*H04N 5/76* (2006.01)

(52) U.S. Cl.
USPC ...................................... 348/231.4; 381/94.1

(58) Field of Classification Search
USPC ................ 348/14.08, 14.09, 231.4; 381/71.1, 381/71.14, 94.1, 94.9, 92
See application file for complete search history.

(56) References Cited

U.S. PATENT DOCUMENTS

| | | | | |
|---|---|---|---|---|
| 5,471,538 | A | 11/1995 | Sasaki et al. | |
| 6,757,397 | B1 * | 6/2004 | Buecher et al. | 381/122 |
| 6,795,558 | B2 * | 9/2004 | Matsuo | 381/92 |
| 7,680,287 | B2 * | 3/2010 | Amada et al. | 381/92 |
| 2004/0066941 | A1 | 4/2004 | Amada et al. | |
| 2008/0219470 | A1 * | 9/2008 | Kimijima | 381/92 |
| 2009/0086993 | A1 * | 4/2009 | Kawaguchi et al. | 381/92 |
| 2010/0008519 | A1 * | 1/2010 | Hayakawa et al. | 381/94.1 |
| 2010/0026858 | A1 * | 2/2010 | Kanamori | 348/241 |
| 2011/0200205 | A1 * | 8/2011 | Tokuda | 381/92 |

FOREIGN PATENT DOCUMENTS

| | | |
|---|---|---|
| CN | 101398475 A | 4/2009 |
| JP | A-5-316587 | 11/1993 |
| JP | A-2005-244613 | 9/2005 |
| JP | A-2006-067355 | 3/2006 |

OTHER PUBLICATIONS

Yutaka Kaneda, "Directivity characteristics of adaptive microphone-array for noise reduction (AMNOR)," Journal of the Acoustical Society of Japan, vol. 44, No. 1, pp. 23-30, 1988 (with translation).
Sep. 11, 2012 Office Action issued in Japanese Patent Application No. 2009-152051 (with translation).
Nov. 14, 2013 Office Action issued in Chinese Patent Application No. 201010215324.9 (with English language translation).

* cited by examiner

*Primary Examiner* — Tuan Ho
*Assistant Examiner* — Selam Gebriel
(74) *Attorney, Agent, or Firm* — Oliff PLC

(57) ABSTRACT

An image pickup apparatus includes: a first sound-collection unit that detects an ambient sound and outputs first sound information; a second sound-collection unit other than the first sound-collection unit that detects the sound and outputs second sound information; and a signal processing unit that generates a sound signal corresponding to the sound by eliminating a common noise signal included in the first sound information and the second sound information based on the first sound information and the second sound information.

13 Claims, 6 Drawing Sheets

IMAGE PICKUP APPARATUS WITH NOISE ELIMINATION

BACKGROUND

Priority is claimed on Japanese Patent Application No. 2009-152051, filed on Jun. 26, 2009, the contents of which are incorporated herein by reference.

FIELD OF THE INVENTION

The present invention relates to an image pickup apparatus that collects a sound when a moving picture is photographed.

DESCRIPTION OF THE RELATED ART

There are cases where operation sounds generated by operating an image pickup apparatus are detected as noise at a time when a sound is collected so as to be matched with photographing a moving picture by being included in the collected sound. Thus, an image pickup apparatus that performs a noise reduction process for reducing such noise is known (for example, see Japanese Unexamined Patent Application, First Publication No. 2005-244613).

However, according to general technology, a portion in which the noise is generated is predetermined, and a microphone used for collecting the noise is disposed near a noise generating portion. In such a noise reduction method, in a case where the noise generating portions are scattered, a microphone needs to be disposed for each noise generating portion. For example, in a case where a driving unit that is disposed on a lens barrel of a lens exchangeable camera and drives an auto focus function or the like is the noise generating portion, there is a problem in that a microphone should be disposed inside the lens barrel.

An object of an embodiment of the present invention is to provide an image pickup apparatus capable of reducing collected operation sounds in a case where sounds are collected so as to be matched with photographing a moving picture.

SUMMARY

According to an embodiment of the present invention, there is provided an image pickup apparatus including: a first sound-collection unit that detects ambient sound and outputs first sound information; a second sound-collection unit other than the first sound-collection unit that detects the sound and outputs second sound information; and a signal processing unit that generates a sound signal corresponding to the sound by eliminating a common noise signal included in the first sound information and the second sound information based on the first sound information and the second sound information.

DETAILED DESCRIPTION

First Embodiment

An image pickup apparatus according to a first embodiment of the present invention will be described below with reference to the accompanying drawings.

Figure 1A:
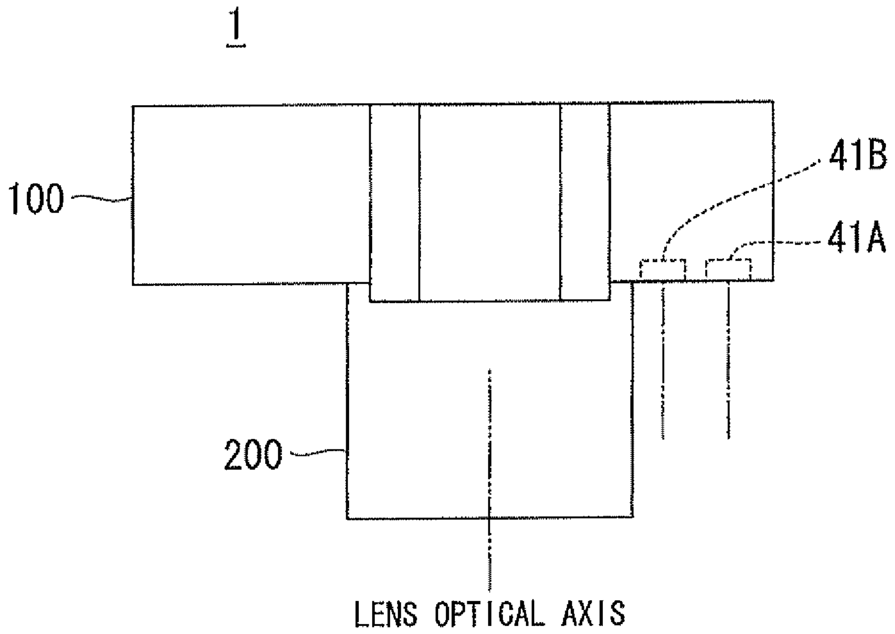
FIG. 1A is a top view of an image pickup apparatus according to the first embodiment of the present invention.
Figure 1B:
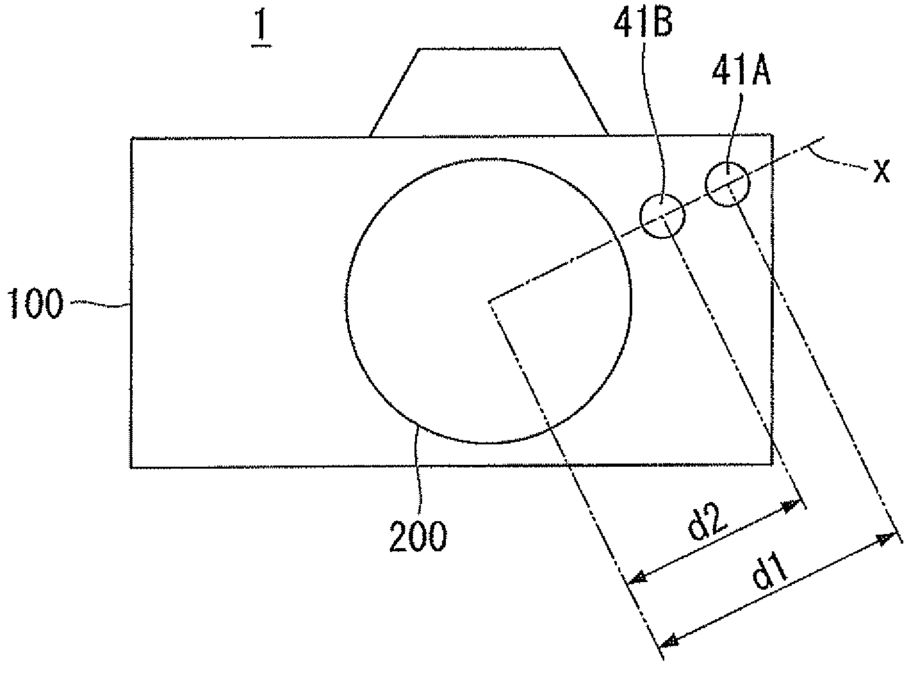
FIG. 1B is a front view of the image pickup apparatus.

FIG. 1A is a top view of an image pickup apparatus 1 according to the first embodiment of the present invention. FIG. 1B is a front view of the image pickup apparatus 1.

The image pickup apparatus 1 includes a camera main body 100 and a lens barrel 200 that is disposed on the camera main body 100 so as to be detachably attached thereto. The lens barrel 200 is mounted on the camera main body 100 through a lens mount that is disposed on the front face of the camera main body 100.

In addition, on the front face of the camera main body 100, a microphone 41A and a microphone 41B are disposed. The microphones 41A and 41B are disposed within a plane approximately perpendicular to the lens optical axis of the lens barrel 200, that is, the front face of the camera main body 100. The microphones 41A and 41B are arranged such that a distance d1 from the lens optical axis of the lens barrel 200 to the microphone 41A and a distance d2 from the lens optical axis to the microphone 41B are different from each other.

In addition, the microphones 41A and 41B are disposed such that the lens optical axis of the lens barrel 200, the microphone 41A, and the microphone 41B are sequentially arranged on one straight line x within the plane approximately perpendicular to the lens optical axis.

Figure 2:
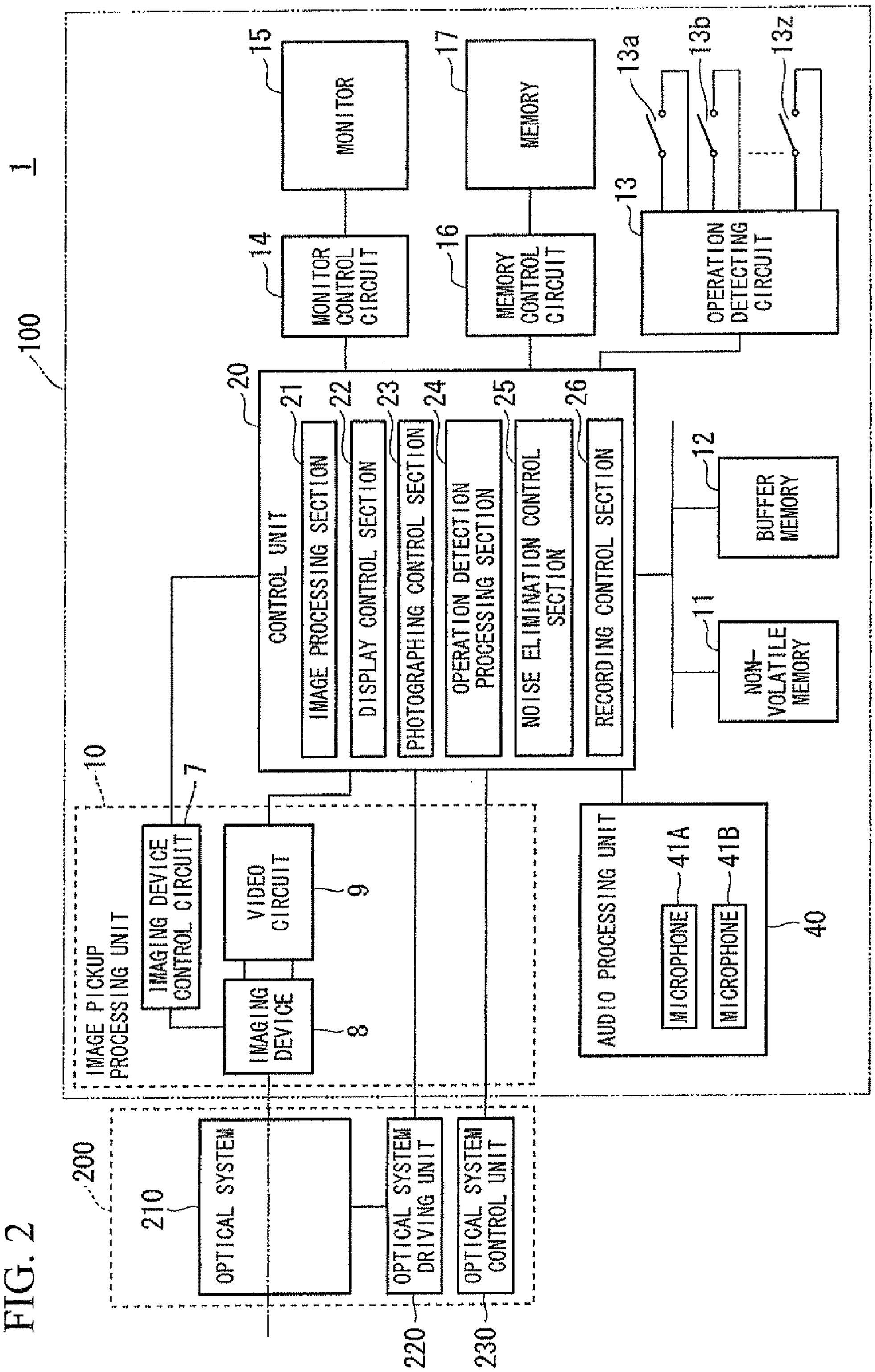
FIG. 2 is a block diagram showing the configuration of the image pickup apparatus.

FIG. 2 is a block diagram showing the configuration of the image pickup apparatus according to this embodiment. The image pickup apparatus 1 shown in FIG. 2 includes the camera main body 100 and the lens barrel 200 that is mounted on the camera main body 100.

The lens barrel 200 of the image pickup apparatus 1 includes an optical system 210, an optical system driving unit 220, and an optical system control unit 230.

The optical system 210 of the lens barrel 200 includes an optical device that adjusts the output of light onto an imaging device 8 and a structure that protects the optical device and the like. For example, the optical system 210 has a zoom function for changing an angle of view for photographing, an aperture function for adjusting the amount of passing light, a function for correcting image shake due to hand movement, a function for adjusting the focus, and the like. In the optical system 210, various sensors, encoders, and the like for detecting the states thereof are disposed. The optical system driving unit 220 adjusts the output of light onto the imaging device 8 by driving the optical system 210 in accordance with a control signal transmitted from the control unit 20 by using an actuator such as a motor. The optical system control unit 230 collects information of various sensors and encoders that are disposed in the optical system 210 and notifies the control unit 20 of the collected information. As the information notified from the optical system control unit 230, there are lens type information that represents the type of the lens barrel 200, lens focal distance information, an aperture value set by the aperture function, subject distance information according to a range ring disposed on the lens barrel 200, and the like.

The camera main body 100 of the image pickup apparatus 1 includes an image pickup processing unit 10, a non-volatile memory 11, a buffer memory 12, an operation detecting circuit 13, a monitor control circuit 14, a monitor 15, a memory control circuit 16, a memory 17, a control unit 20, and an audio processing unit 40.

The image pickup processing unit 10 of the camera main body 100 includes an imaging device control circuit 7, an imaging device 8, and a video circuit 9. The imaging device 8 is a light receptor device such as a CCD (Charge-Coupled Device) or a CMOS (Complementary Metal Oxide Semiconductor) sensor. The imaging device 8 converts an image that is output from the optical system 210 and is imaged into an electrical signal and outputs an analog image signal. To the imaging device 8, the video circuit 9 and the imaging device control circuit 7 are connected. The video circuit 9 amplifies the image signal output from the imaging device 8 and converts the image signal into a digital signal. The imaging device control circuit 7 controls operations such as conversion of the image formed by the imaging device 8 into an image signal and output of the converted image signal by driving the imaging device 8.

In the non-volatile memory 11, a program used for operating the control unit 20, image data that is picked up and generated, collected sound information, and information such as various settings or image pickup conditions that are input from the user are stored. In addition, as stored information, the waveform, frequency component, sound pressure information, and the like of operation sounds that change in accordance with time are recorded in advance as information representing the characteristics of the operation sounds of the image pickup apparatus 1.

The buffer memory 12 is a memory area for temporary information that is used for a control process of the control unit 20. For example, the image signal output from the imaging device 8, the image data generated in accordance with the image signal, and the like are temporarily stored in the buffer memory 12 by the control unit 20.

The operation detecting circuit 13 detects a user's operation input to the input unit and inputs the detected operation information to the control unit 20 as a control signal. The input unit, for example, includes a power switch 13*a*, a release switch 13*b*, and the like 13*c* to 13*z*. In order to give the user the feeling of an operation when operating the input unit, a plate spring or the like is disposed in the input unit, as is necessary. As the input unit is pressed down up to a predetermined position and the plate spring is bent, the user is provided with a sense of clicking. A minute vibration is generated in accordance with the reaction of the plate spring and is propagated to the camera main body 100.

In addition, in the operation detecting circuit 13, an AF operating means 13AF used for controlling an auto focus (AF) operation, a selector button 13SEL for setting a photograph mode etc., and the like are included. Even when an operation is performed during the photographing process, the control unit 20 accepts input operation information, outputs a control direction corresponding to the operation information, and stores the operation direction information in the non-volatile memory 11.

The monitor control circuit 14, for example, performs display control of the monitor 15 such as turn-on, turn-off, or brightness adjustment of the monitor 15 and a process of displaying the image data output from the control unit 20 on the monitor 15. The monitor 15 displays the image data. For example, the monitor 15 is configured by a liquid crystal display (LCD).

The memory control circuit 16 controls the input and the output of information between the control unit 20 and the memory 17. For example, the memory control circuit 16 performs a process of storing information such as image data or sound data generated by the control unit 20 in the memory 17, a process of reading out information such as the image data or the sound data stored in the memory 17 and outputting the information to the control unit 20, or the like. The memory 17 is a storage medium such as a memory card that can be removed from the camera main body 100. In the memory 17, the image data, the sound data, and the like that are generated by the control unit 20 are stored.

The audio processing unit 40 collects sound information that is recorded in accordance with the pickup of a moving picture by using the microphones 41A and 41B and generates audio to be recorded by performing the necessary signal processing for the sound information.

Figure 3:
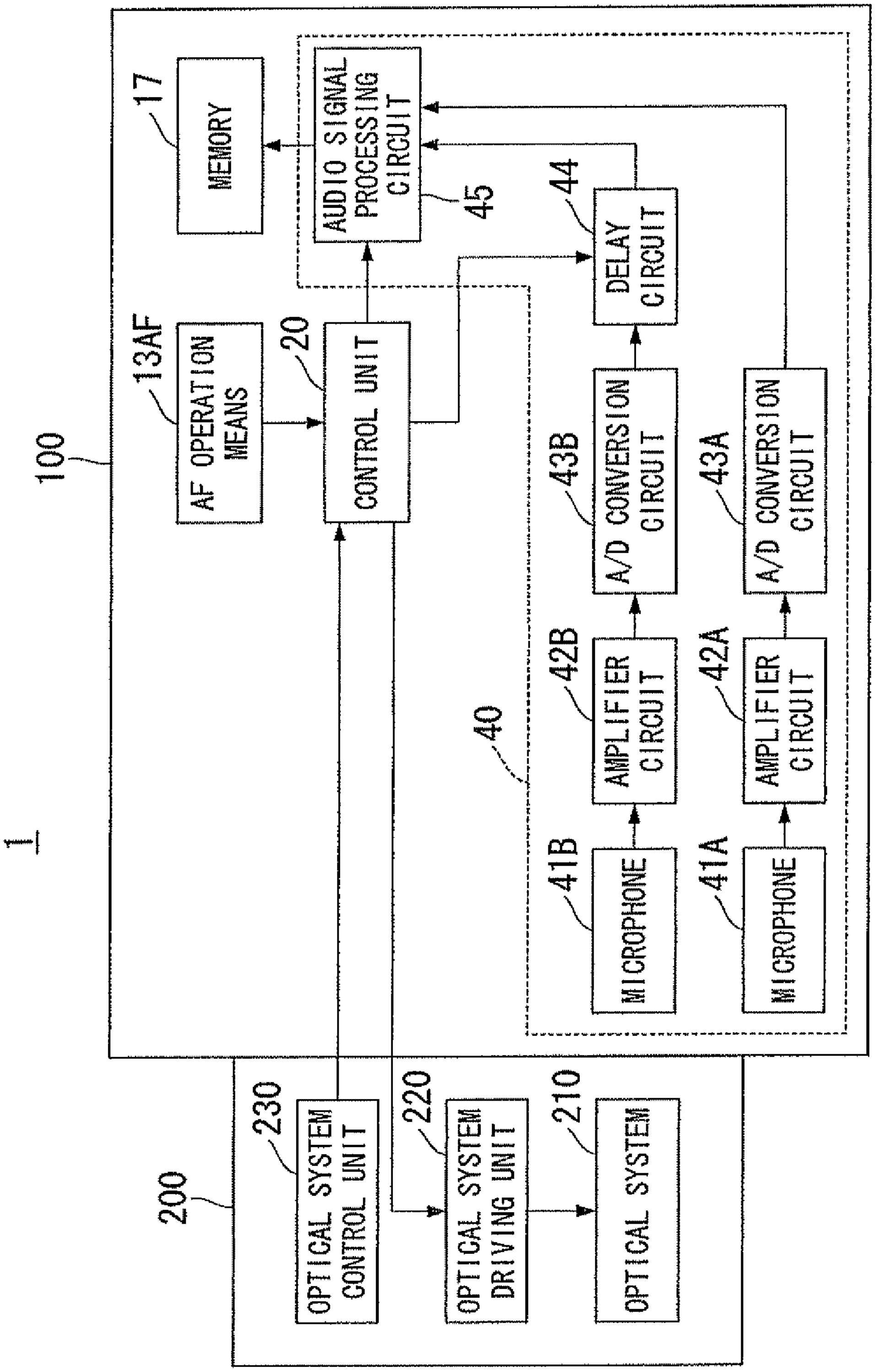
FIG. 3 is a schematic block diagram showing the configuration of an audio processing unit according to the embodiment.

FIG. 3 is a schematic block diagram showing the configuration of the audio processing unit 40 according to this embodiment and represents a major configuration for performing an auto focus operation. In FIG. 3, the same reference sign is attached to each configuration as that shown in FIGS. 1A, 1B, and 2.

The audio processing unit 40 includes the microphones 41A and 41B, amplifier circuits 42A and 42B, analog-to-digital (A/D) conversion circuits 43A and 43B, a delay circuit 44, and an audio signal processing circuit 45.

The microphones 41A and 41B of the audio processing unit 40 convert the sounds that are collected when a moving picture is recorded and output sound signals.

The amplifier circuits 42A and 42B amplify the sound signals converted by the microphones 41A and 41B at predetermined amplification factors. The amplification factors are set by the control unit 20.

The A/D conversion circuits 43A and 43B convert the amplified sound information into digital signals.

A first system formed by the microphone 41A, the amplifier circuit 42A, and the A/D conversion circuit 43A outputs a first digital sound signal. In addition, a second system formed by the microphone 41B, the amplifier circuit 42B, and the A/D conversion circuit 43B outputs a second digital sound signal.

It is preferable that the microphone 41A, the amplifier circuit 42A, and the A/D conversion circuit 43A of the first system and the microphone 41B, the amplifier circuit 42B, and the A/D conversion circuit 43B of the second system be symmetrically configured and have the same characteristics.

The delay circuit 44 performs a delay process for the second digital sound signal of which the sound is collected by the second system based on a set delay time and outputs a delayed digital signal.

The audio signal processing circuit 45 receives the first digital sound signal and the delayed digital signal as input and performs a difference process for the first digital sound signal and the delayed digital signal with a time difference set by the two signals being maintained. The audio signal processing circuit 45 performs a signal reproducing process based on the result of the difference process and outputs a reproduction signal for which the reproduction process is performed as recording information. The recording information is input to the control unit 20 and is written into the memory 17 through the memory control unit 16. FIG. 3 shows a simplified configuration for recording a reproduction signal for which the signal reproducing process is performed by the audio signal processing circuit 45 in the memory 17.

The control unit 20 will be described with reference to FIG. 2.

The control unit 20 is configured by a CPU (Central Processing Unit) that controls the operation of each unit of the camera main body 100 in accordance with a program stored in the non-volatile memory 11. For example, the control unit 20 performs input of power to the camera main body 100, driving control of the optical system 210 through the optical system driving unit 220, driving control of the imaging device 8 through the imaging device control circuit 7, display control of the monitor 15 through the monitor control circuit 14, a photographing process of a subject detected by the imaging device 8, and control of signal processing of the sound information collected by the audio processing unit 40, in accordance with the operation information input to the operation detecting circuit 13 by the user.

The control unit 20 includes an image processing section 21, a display control section 22, a photographing control section 23, an operation detection processing section 24, a noise elimination control section 25, and a recording control section 26.

The image processing section 21 of the control unit 20 reads out an image signal, which is output to the video circuit 9, perceived within an image forming area of the imaging device 8 and performs image processing of generating image data based on the read-out image signal. The image processing section 21 stores the image data generated by the image processing in the buffer memory 12. The display control section 22 reads out the image data that is generated by the image processing section 21 and is stored in the buffer memory 12 each predetermined time interval and outputs the read-out image data to the monitor 15 in real time. Here, the predetermined time interval is, for example, 1/60 seconds. In such a case, by the display control unit 22, the image data of 60 frames per second is displayed on the monitor 15 as a through image and is recorded in the memory 17 as a moving picture.

The photographing control section 23 outputs necessary control signals to each unit in accordance with the input of a control signal, which is based on the user's operation input, such as a photographing process starting direction or a photographing process completing direction used for controlling a photographing process from the operation detecting circuit 13. When the photographing process starting direction is input, the photographing control section 23 performs an image pickup process of generating the image data by driving the optical system 210. The photographing control section 23 controls focusing, exposure control, zooming, and the like of the optical system 210 through the optical system control unit 230 in accordance with the photographing conditions input from the user in advance.

The operation detection processing unit 24 determines the user's operation information detected by the operation detecting circuit 13, records the determined information in the memory, and outputs control directions of various necessary processes. For example, when the auto focus (AF) operation is detected by the AF operation means 13AF, AF control is performed by adjusting the optical system 210 by driving an AF control motor that performs the AF control of the optical system driving unit 220 of the lens barrel 200.

The noise elimination control section 25 determines noise and a place in which the noise is generated in accordance with the user's operation information detected by the operation detection processing section 24 and controls the audio processing unit 40 so as to reduce the noise.

The recording control section 26 associates the sound information in which the noise is reduced by the audio processing unit 40 controlled by the noise elimination control section 25 with the moving picture information and writes the sound information and the moving picture information in the memory to be recorded.

A noise reduction process of this embodiment will now be described.

As the noise that is reduced by the process of the noise elimination control section 25, there are drive sounds of an actuator (a motor or the like) that generates vibrations when driving the optical driving unit 220 for controlling the optical system 210, operation sounds that are generated when the plate spring built in the input unit of the operation detecting circuit 13 is bent in accordance with an input operation, and the like. As a common feature, such noise is generated in accordance with user operations. The place and time in which the noise is generated can be derived based on the signal detected by the input unit of the operation detecting circuit 13.

A sound that is generated in a place such as a subject located far from the image pickup apparatus 1 can be regarded as simultaneously reaching the microphones 41A and 41B. The reason for this is that the difference in the distances from the location of the subject to the microphones 41A and 41B is short relative to the distance between the microphones 41A and 41B.

On the other hand, propagation times until a sound generated by the optical system driving unit 220 that generates vibrations in accordance with the operation of the operation detecting circuit 13 is collected by the microphones 41A and 41B are different from each other. The reason for this is that, as shown in FIGS. 1A and 1B, the optical system driving unit 220 is placed in a position close to the microphones 41A and 41B relative to the distance (d1−d2) between the microphones 41A and 41B.

The propagation times of the drive sounds for reaching the microphones 41A and 41B can be determined in advance in accordance with the disposition of the optical system driving unit 220 and the microphones 41A and 41B. The noise elimination control section 25 performs a control operation for reducing drive sounds specified as noise by using the difference between the propagation times.

FIGS. 4A to 4E are diagrams representing a noise reduction process according to this embodiment. The waveforms shown in FIGS. 4A to 4E schematically represent the sound pressure level of sounds converted by the microphones 41A and 41B. The vertical axis represents the sound pressure level, and the horizontal axis represents the elapse of time.

FIGS. 4A to 4E are waveforms SA and SB representing sounds that are collected by the microphones 41A and 41B. The basic waveforms, which are continuous at a low frequency, appearing to have the same phase are waveforms schematically showing the sounds from a remote subject. Waveforms during the first period, which are overlapped with the basic waveforms of the waveforms SA and SB shown in FIGS. 4A and 4B at time $t_2$ and $t_1$, appearing to have frequency components higher than those of the basic waveforms represent the waveforms of common noise detected together with the basic waveforms. The noise is made up of noise Na and Nb. In FIGS. 4A to 4E, for the convenience of description, the noise Na and Nb appear during the first period. Actually, the noise may be continuous in the waveforms.

Comparing the times at which the noise is detected to each other, the time when the noise Na is detected by the microphone 41A, which is placed relatively far from the optical system driving unit 220, is delayed by time $t_d$ from the time when the noise Nb is detected by the microphone 41B that is disposed relatively close to the optical system driving unit 220. Since being determined based on the disposition of the sound source and the microphones, the delay time may be configured to be stored in a memory area in association with the information representing a sound source as a control variable determined in advance.

Figure 4A:
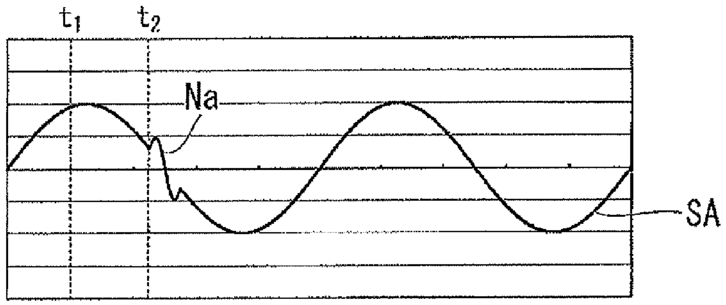
FIGS. 4A to 4E are graphs showing temporal changes in sound pressure levels according to a noise reduction process of the embodiment.
Figure 4B:
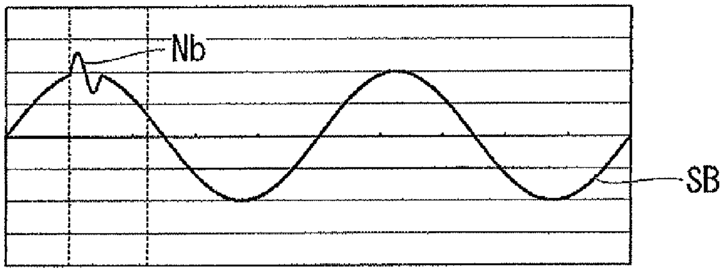
Figure 4C:
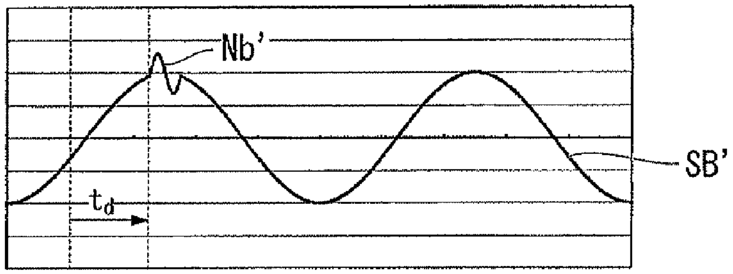

FIG. 4C represents a waveform SB' that is acquired by delaying the waveform SB shown in FIG. 4B by time $t_d$ by using the delay circuit 44. By performing this delay process, a noise Nb' acquired by delaying the noise Nb by time $t_d$ is derived. The phases of the noise Na and Nb are matched with each other. In other words, the noise Na and the noise Nb' that is adjusted to match the timing of the noise Na can be synchronized with each other. Here, time $t_d$ is a value that is based on a direction transmitted from the noise elimination control section 25.

Figure 4D:
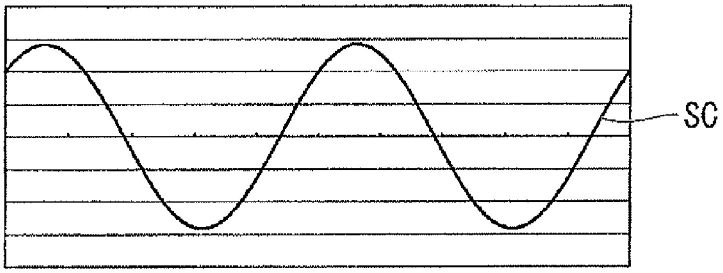

FIG. 4D shows the waveform SC of a difference signal that is generated by a subtraction process of subtracting the amplitude level of the waveform SB' shown in FIG. 4C from the amplitude level of the waveform SA shown in FIG. 4A by using the audio signal processing circuit 45.

In the difference signal that is derived by the subtraction process, the noise Na and the noise Nb are offset from each other, and accordingly, a noise component is not included therein. This difference signal has a waveform, which is different from the waveform of the original signal, being distorted by the subtraction process.

Figure 4E:
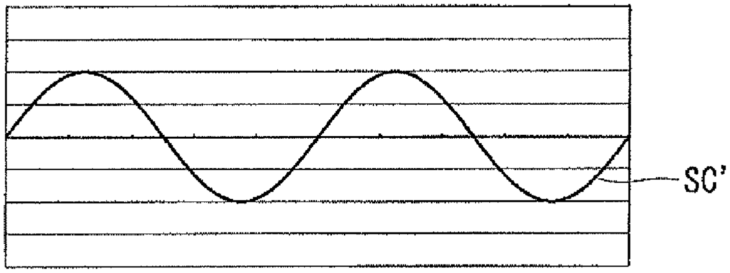

FIG. 4E shows the waveform SC' that is reproduced by the audio signal processing circuit 45 based on the waveform SC shown in FIG. 4D for which the subtraction process has been performed. By performing a process having the opposite characteristic of negating the above-described process up to the subtraction process, the reproduction process can be performed.

As described above, even in a case where noise is mixed in the signals, by allowing the noise included in the signals acquired by two microphones to offset from each other, then an original signal from which the noise is eliminated can be reproduced.

In addition, noise is overlapped with the signals at different delay times depending on the place where the noise is generated. Although the delay times are different from each other, by determining the place in which the noise is generated, a delay time corresponding to the place can be set.

For example, in this embodiment, noise that is generated in a case where the AF function is driven has been described. However, the present invention can be applied to a case where noise generated by an actuator driving a function other than that included inside the lens barrel 200 is to be reduced. There are cases where the delay time changes in accordance with the position of the driven actuator. Even in such a case, the position of the driven actuator can be determined based on the information detected by the operation detecting circuit 13 and the structure of the lens barrel 200.

In the above-described order, a detailed example of the noise reduction process will be presented.

During a period in which an AF mechanism is not operated, audio from the microphone 41A is recorded without performing the process performed by the delay circuit 44 of the second system and the like.

During a period in which the AF mechanism is operated, a delay time corresponding to the position of generation of the noise is set by the delay circuit 44, and the noise reduction process is performed.

The control unit 20 derives a predetermined delay time in accordance with an operation input that is detected by the operation detecting circuit 13. The delay time is stored in the non-volatile memory 11 that can be referenced from the control unit 20 as a table having the operation input information as a key.

The control unit 20 sets the derived delay time in the delay circuit and allows the audio signal processing circuit 45 to perform a calculation process for the audio signals of the two systems by functioning the second system. The control unit 20 records the result derived by the calculation process of the audio signal processing circuit 45 in the memory 17 as an audio signal. In this audio signal, a time corresponding to the delay time derived by performing the delay process for the second system is shifted. The control unit 20 can record continuous audio without stopping the audio due to the delay time by recording the audio after performing a correction operation of absorbing the delay time of the audio.

In addition, the audio signal needs to be recorded in synchronization with a video signal. The control unit 20 synchronizes the video signal and the audio signal with each other and records the video signal and the audio signal as being associated with each other.

In addition, the control unit 20 can determine the type of the lens barrel 200 that is attached to the camera main body 100 by acquiring the lens type information indicating the lens type from the lens barrel 200. The generated operation sounds can be determined by registering the information representing the characteristics of operation sounds generated in accordance with the lens type information and by referring to necessary information with the lens type information being used as the key. As the information representing the characteristics of the operation sound, there are the position information of each actuator, the waveform information representing a change in the operation sounds generated in accordance with the vibrations of the driven actuator, the frequency component information thereof, the sound pressure level information of the operation sounds, and the like. The position information of each actuator can be information representing the arrival time of the operation sounds at each microphone from each actuator or information representing a time difference in the arrival times, instead of the information representing the physical disposition.

The information representing the arrival time or the time difference in the arrival times can be a value registered based on a measured value instead of a predetermined value by driving the actuator and measuring the sound collected by the microphones.

The control unit 20 determines the input operation and outputs a control signal to the actuator. Accordingly, the timing when the actuator is operated can be detected. Therefore, the noise reduction process for reducing the noise can be changed to be effective before the operation sounds transmitted from the actuator arrive at the microphones. It may be configured such that the collection of a sound during the noise reduction process is performed by using two microphones, and the collection of sound during stopping of the noise reduction process is performed by using one microphone.

In addition, in the above-described embodiment, noise included in sounds that are adaptively collected by using a plurality of microphones is eliminated by setting the subtraction process by adjusting the time difference between signals converted by two microphones. In addition, as a calculation method used in the noise reduction process, there is a technique called AMNOR (Adaptive Microphone array for NOise Reduction) (for example, see "Kaneda, Directivity Characteristics of Adaptive Microphone Array for Noise Reduction (AMNOR)", Journal of the Acoustical Society of Japan, Volume 44, issue no. 1, p 23-30, 1988)". The noise reduction process of the signal processing circuit 45 can be performed by using the AMNOR method.

Second Embodiment

An image pickup apparatus according to a second embodiment of the present invention will be described below with reference to the accompanying drawings.

Figure 5A:
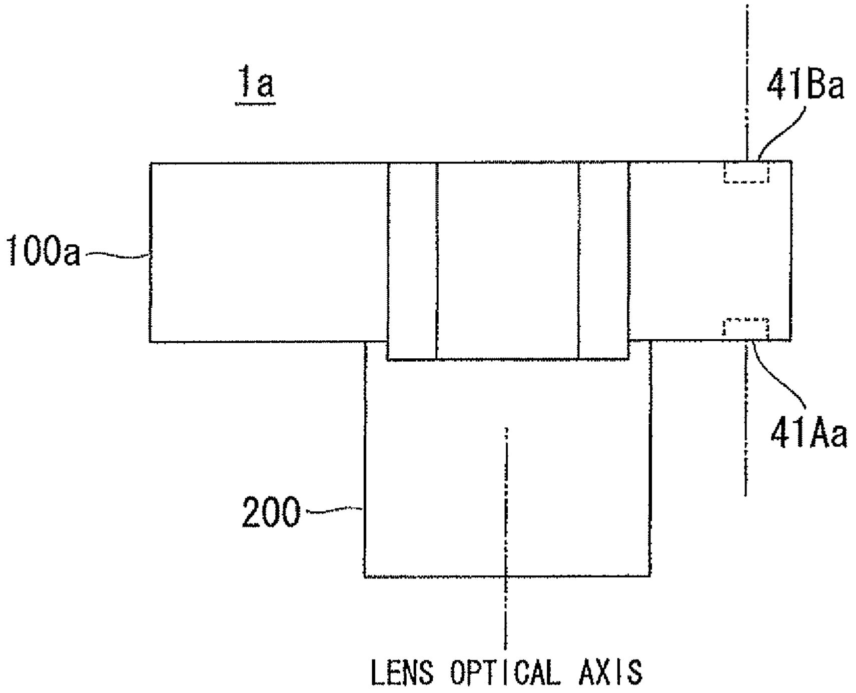
FIG. 5A is a top view of an image pickup apparatus according to a second embodiment of the present invention.
Figure 5B:
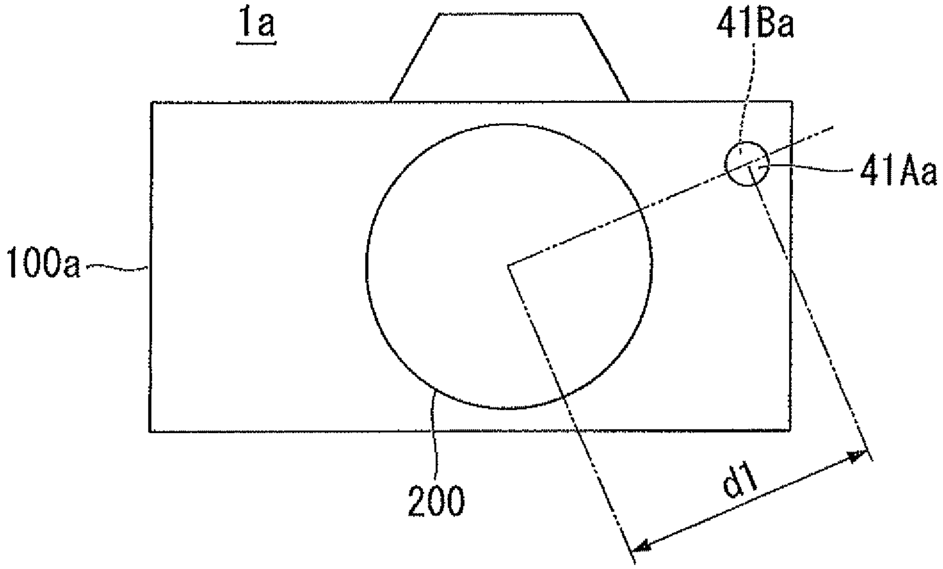
FIG. 5B is a front view of the image pickup apparatus.

FIG. 5A is a top view of an image pickup apparatus 1*a* according to the second embodiment of the present invention. FIG. 5B is a front view of the image pickup apparatus 1*a*. To each configuration that is the same as that shown in FIGS. 1A and 1B, the same reference sign is attached.

The image pickup apparatus 1*a* includes a camera main body 100*a* and a lens barrel 200 that is disposed on the camera main body 100*a* so as to be detachably attached thereto. The lens barrel 200 is mounted on the camera main body 100*a* through a lens mount that is disposed on the front face of the camera main body 100*a*.

In addition, on the front and rear faces of the camera main body 100*a*, a microphone 41Aa and a microphone 41Ba are disposed. The microphones 41Aa and 41Ba are disposed on a straight line that is approximately parallel to the lens optical axis of the lens barrel 200. In other words, the microphones 41Aa and 41Ba are arranged so as to be apart from the optical axis of the lens barrel 200 by the same distance d1.

According to the image pickup apparatus 1*a* of the second embodiment, the disposition of the microphones is different from that of the image pickup apparatus 1 shown in FIGS. 1A and 1B. However, the configuration shown in FIGS. 2 and 3 can be referred to for the image pickup apparatus 1*a* for the noise reduction process.

The camera main body 100*a*, the audio processing unit 40*a*, and the microphones 41Aa and 41Ba can be read by being replaced by the camera main body 100, the audio processing unit 40, and the microphones 41A and 41B.

In a case where the sound pressure levels of the operation sounds arriving at the two microphones are different from each other, the amplification factors of the amplifier circuits 42A and 42B are set in accordance with the detected sound pressure levels. Since the amplification factors are set to difference values, two signals need to be composed together after the delay times and the amplitudes of the noise of the two signals are matched to each other.

The delay time of the delay circuit 44 is set to an appropriate value so that timings of the included noise are matched to each other, which is the same as in the first embodiment. In a reproduction process performed based on the difference signal from which the noise is eliminated, there is a time difference in times when desired sounds are collected by the two microphones. Thus, the time difference is set as a variable of the reproduction process.

Third Embodiment

An image pickup apparatus according to a third embodiment of the present invention will be described below with reference to the accompanying drawings.

Figure 6:
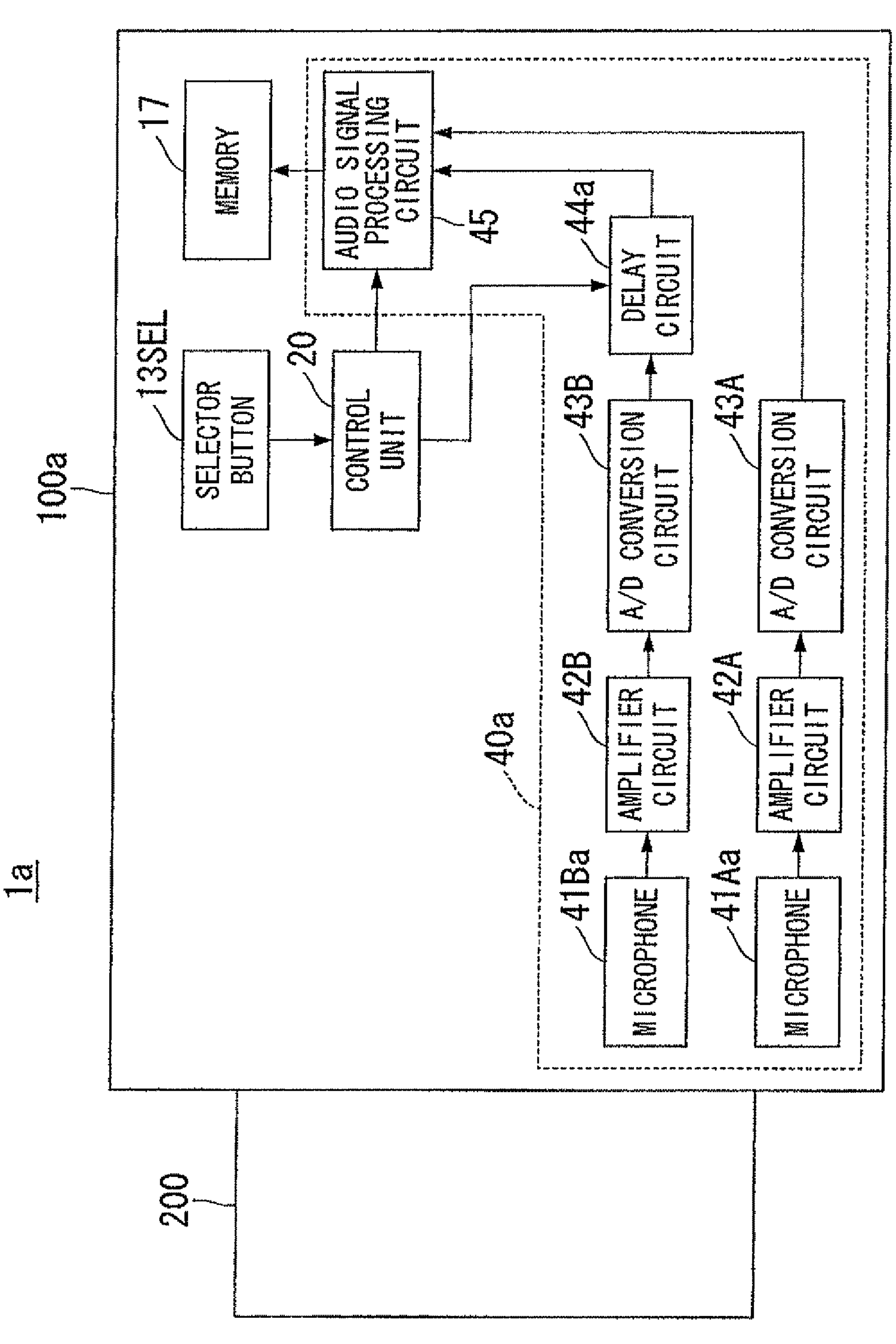
FIG. 6 is a schematic block diagram showing an image pickup apparatus according to a third embodiment of the present invention.

FIG. 6 is a schematic block diagram representing another use of the image pickup apparatus 1*a* according to this embodiment. FIG. 6 shows a main configuration for performing a selection operation such as a mode setting. To each configuration that is the same as that shown in FIGS. 1A, 1B, 2, and 3, the same reference sign is attached.

When detecting a selection input operation, for example, in accordance with an operation of the selector button 13SEL, the operation detection processing section 24 (see FIGS. 1A and 1B) records information on the detected operation in the memory. The operation detection processing section 24 specifies the operated selector button 13SEL. Since the operated selector button 13SEL has a plate spring on the inside thereof, the plate spring reacts with the operation so as to be curved back. The vibration at this time is transferred to the camera main body 100*a* and is detected by the microphones 41Aa and 41Ba.

In this embodiment, there is no actuator that is driven in accordance with the operation input, and accordingly, the drive sounds are not generated. However, in this embodiment, vibrations according to the operation input become the source of noise generation.

The generated noise is transferred to the camera main body 100*a* and collected by two microphones. The difference in times until the noise is collected by the microphones is set as a delay time of the delay circuit 44*a*, and, the same as in the first embodiment, the process is switched to a noise reduction process in accordance with the detection of the operation input.

In addition, by adding a process described below to the first to third embodiments, the effect of noise reduction can be improved.

The audio signal processing circuit 45 performs a reduction process of the sound information collected by the microphones based on at least one type of characteristic information out of the waveform, the frequency component, and the sound pressure information of drive sounds and operation sounds that change in accordance with time. The waveform, the frequency component, and the sound pressure information of the drive sounds and the operation sounds are characteristic information, which can be set in advance and stored in the non-volatile memory 11 or the like so as to be referred to by the control unit 20.

By comparing the noise collected by each microphone to the above-described characteristic information, the time when the noise is included can be specified. A delay time can be derived based on the specified time, and the delay time can be used as delay time information that is stored in a table in advance.

In addition, the aspects of the present invention are not limited to the above-described embodiments and may be changed within the scope not departing from the basic concept of the present invention. In the image pickup apparatus according to an embodiment of the present invention, the audio signal processing function has been described to delay one signal for adjustment of the delay time. However, since the phases of the included noise need to be matched to each other, instead of the delaying of one signal, time shift can be performed so as to eliminate the relative difference.

In addition, a form in which the AF mechanism is driven by the optical system driving unit 220 has been shown. However, the target to be driven can be a hand shake correcting mechanism, which corrects hand shake, or a zoom mechanism that controls the optical system 210. Furthermore, a form in which an actuator (motor) driving the AF mechanism is disposed inside the camera main body 100, and coupling driving of mechanically driving the actuator is performed can be used. In such cases, the delay time according to each form is stored in the non-volatile memory 11 or the like, and the delay time is set.

In addition, the characteristic information such as the waveform, the frequency component, and the sound pressure information of the drive sounds and the operation sounds that changes in accordance with time has been described to be stored in the nonvolatile memory 11 or the like. However, a form in which the characteristic information is stored in the memory unit inside the optical system control unit 230 that is disposed inside the lens barrel 200 can be used.

In addition, according to an embodiment of the present invention, the microphone 41A of the image pickup apparatus 1 detects ambient sounds and outputs the first sound information. The microphone 41B other than the microphone 41A detects the sound and outputs second sound information. The audio signal processing circuit 45 eliminates a common noise signal included in the first sound information and the second sound information by using the first sound information and the second sound information and generates one sound signal corresponding to the sound.

In addition, according to the above-described embodiment, the audio signal processing circuit 45 eliminates noise signals based on the amount of difference on the time axis between a noise signal included in the first sound information and a noise signal included in the second sound information and the amount of difference on the time axis between the sound included in the first sound information and the sound included in the second sound information.

In addition, in the above-described embodiment, the audio signal processing circuit 45 eliminates the noise signals by relatively shifting the first sound information and the second sound information in time such that the noise signal included in the first sound information and the noise signal included in the second sound information are in synchronization with each other.

In addition, according to the above-described embodiment, the optical system driving unit 220 generates noise that becomes a noise signal. The audio signal processing circuit 45 relatively shifts the first sound information and the second sound information in accordance with the position information of the optical system driving unit 220.

In addition, in the above-described embodiment, the position information of the optical system driving unit 220 is information that is acquired based on the difference between the propagation time until the noise arrives at the microphone 41A from the optical system driving unit 220 and a propagation time until a noise arrives at the microphone 41B from the optical system driving unit 220.

In addition, in the above-described embodiment, the noise signal is based on the operation sounds generated by the operation of the image pickup apparatus 1. The audio signal processing circuit 45 eliminates the noise signal based on at least one of start of the operation and stop of the operation.

In addition, in the above-described embodiment, the signal processing unit eliminates the noise signal based on at least one type of the waveform, the frequency component, and the sound pressure information that are set in advance.

In addition, in the above-described embodiment, the microphones 41A and 41B are disposed within the plane approximately perpendicular to the lens optical axis of the image pickup apparatus 1, and the distance from the lens optical axis to the microphone 41A and the distance from the lens optical axis to the microphone 41B are different from each other.

In addition, in the above-described embodiment, within the plane approximately perpendicular to the lens optical axis, the lens optical axis and the microphones 41A and 41B are sequentially disposed on one straight line.

In addition, in a case where a microphone used for noise detection is arranged inside the lens barrel, the noise information needs to be transmitted to the camera main body from the lens barrel. Accordingly, the lens mount needs to be changed. However, according to the above-described embodiment, the microphone is not arranged inside the lens barrel, and accordingly, the existing lens mount can be directly used without being changed. In addition, as shown in this embodiment, even in a case where a noise source is included inside the lens barrel, no microphone is disposed inside the lens barrel. Accordingly, the present invention can be also applied to a case where an existing interchangeable lens is used. In a case where the position information of a noise source is not output from the lens barrel, by setting the delay time information corresponding to the non-volatile memory 11 of the camera main body or the like in advance, the above-described configuration can be used similarly.

What is claimed is:

1. An image pickup apparatus comprising:

a first sound-collection unit that detects an ambient sound and outputs first sound information;

a second sound-collection unit, other than the first sound-collection unit, that detects the ambient sound and outputs second sound information; and a signal processing unit that generates a sound signal corresponding to the ambient sound by eliminating a common noise signal included in the first sound information and the second sound information based on the first sound information and the second sound information, wherein:

the signal processing unit generates a sound signal in which the noise signal is reduced by performing a relative time shift between the first sound information and the second sound information and a subtraction process in which the second sound information is subtracted from the first sound information; and the signal processing unit generates the sound signal corresponding to the ambient sound by applying a correction factor to the generated sound signal in which the noise signal is reduced, the correction factor reducing a feature arising from the subtraction process in which the second sound information is subtracted from the first sound information.

2. An image pickup apparatus comprising:

a first sound-collection unit that detects an ambient sound and outputs first sound information;

a second sound-collection unit, other than the first sound-collection unit, that detects the ambient sound and outputs second sound information; and a signal processing unit that generates a sound signal corresponding to the ambient sound by eliminating a common noise signal included in the first sound information and the second sound information based on the first sound information and the second sound information, wherein:

the signal processing unit generates a sound signal in which the noise signal is reduced by performing a subtraction process in which the second sound information is subtracted from the first sound information while using information which indicates a time difference between the noise signal included in the first sound information and the noise signal included in the second sound information; and the signal processing unit generates the sound signal corresponding to the ambient sound by applying a correction factor to the generated sound signal in which the noise signal is reduced, the correction factor reducing a feature arising from the subtraction process in which the second sound information is subtracted from the first sound information.

3. The image pickup apparatus according to Claim 1, further comprising a noise generating unit that generates noise that becomes the noise signal, wherein the signal processing unit produces the relative time shift between the first sound information and the second sound information in accordance with position information of the noise generating unit.

4. An image pickup apparatus comprising:
a first sound-collection unit that detects an ambient sound and outputs first sound information;
a second sound-collection unit, other than the first sound-collection unit, that detects the ambient sound and outputs second sound information;
a signal processing unit that generates a sound signal corresponding to the ambient sound by eliminating a common noise signal included in the first sound information and the second sound information based on the first sound information and the second sound information; and
a noise generating unit that generates noise that becomes the noise signal,
wherein the signal processing unit eliminates the noise signal by relatively shifting the first sound information and the second sound information in time such that the noise signal included in the first sound information and the noise signal included in the second sound information are in synchronization with each other,
wherein the signal processing unit relatively shifts the first sound information and the second sound information in time in accordance with position information of the noise generating unit, and
wherein the position information of the noise generating unit is information that is based on a difference between a propagation time until the noise arrives at the first sound-collection unit from the noise generating unit and a propagation time until the noise arrives at the second sound-collection unit from the noise generating unit.

5. The image pickup apparatus according to Claim 1,
wherein the noise signal is based on operation sounds generated by an operation of the image pickup apparatus, and
wherein the signal processing unit eliminates the noise signal based on at least one of start of the operation and stop of the operation.

6. The image pickup apparatus according to Claim 1,
wherein the signal processing unit eliminates the noise signal based on at least one of a waveform, a frequency component, and sound pressure information of the noise signal that are set in advance.

7. An image pickup apparatus comprising:
a first sound-collection unit that detects an ambient sound and outputs first sound information;
a second sound-collection unit, other than the first sound-collection unit, that detects the ambient sound and outputs second sound information; and
a signal processing unit that generates a sound signal corresponding to the ambient sound by eliminating a common noise signal included in the first sound information and the second sound information based on the first sound information and the second sound information, wherein:
the signal processing unit eliminates the noise signal by a relative time shift between the first sound information and the second sound information;
the first sound-collection unit and the second sound-collection unit are disposed within a plane that is approximately perpendicular to a lens optical axis of the image pickup apparatus;
a distance between the lens optical axis and the first sound-collection unit and a distance between the lens optical axis and the second sound-collection unit are different from each other; and
the lens optical axis and the first and second sound-collection units are sequentially disposed on one straight line within the plane approximately perpendicular to the lens optical axis.

8. The image pickup apparatus according to Claim 1,
wherein the signal processing unit produces the relative time shift between the first sound information and the second sound information such that the noise signal included in the first sound information and the noise signal included in the second sound information are in synchronization with each other.

9. An image pickup apparatus comprising:
a first sound-collection unit that detects an ambient sound and outputs first sound information;
a second sound-collection unit, other than the first sound-collection unit, that detects the ambient sound and outputs second sound information;
a signal processing unit that generates a sound signal corresponding to the ambient sound by eliminating a common noise signal included in the first sound information and the second sound information based on the first sound information and the second sound information; and
a case in which the first sound-collection unit and the second sound-collection unit are provided, wherein:
the signal processing unit eliminates the noise signal by a relative time shift between the first sound information and the second sound information;
the first sound-collection unit is disposed on a first surface of the case;
the second sound-collection unit is disposed on a second surface of the case, the second surface being on the opposite side of the first surface on which the first sound-collection unit is disposed; and
a distance between the first sound-collection unit and a lens optical axis of the image pickup apparatus is substantially equal to a distance between the second sound-collection unit and the lens optical axis of the image pickup apparatus.

10. The image pickup apparatus according to Claim 1,
wherein the application of the correction factor uses a feature that is opposite to an output from the subtraction process and the feature is applied to the generated sound signal in which the noise signal is reduced.

11. The image pickup apparatus according to Claim 2,
wherein the application of the correction factor uses a feature that is opposite to an output from the subtraction process and the feature is applied to the generated sound signal in which the noise signal is reduced.

12. The image pickup apparatus according to Claim 1,
wherein the signal processing unit amplifies an amplitude of sound information at different amplification factors between the first sound information and the second sound information.

13. An image pickup apparatus comprising:
a first sound-collection unit that detects an ambient sound and outputs first sound information;
a second sound-collection unit, other than the first sound-collection unit, that detects the ambient sound and outputs second sound information; and
a signal processing unit that generates a sound signal corresponding to the ambient sound by eliminating a common noise signal included in the first sound information and the second sound information based on the first sound information and the second sound information, wherein:

the signal processing unit generates a sound signal in which the noise signal is reduced by performing a subtraction process in which the second sound information is subtracted from the first sound information; and the signal processing unit generates the sound signal corresponding to the ambient sound by applying a correction factor to the generated sound signal in which the noise signal is reduced, the correction factor reducing a feature arising from the subtraction process in which the second sound information is subtracted from the first sound information.

* * * * *